(12) United States Patent
Jones et al.

(10) Patent No.: US 9,881,000 B1
(45) Date of Patent: Jan. 30, 2018

(54) AVOIDING SENTIMENT MODEL OVERFITTING IN A MACHINE LANGUAGE MODEL

(71) Applicant: SALESFORCE.COM, INC., San Francisco, CA (US)

(72) Inventors: Michael Jones, Portland, OR (US); Scott Enman, Saint John (CA); Collin Chun-Kit Lee, New York, NY (US); David Campbell, San Francisco, CA (US); Christopher John Nicholls, Frederiction (CA)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

(21) Appl. No.: 15/213,158

(22) Filed: Jul. 18, 2016

(51) Int. Cl.
*G06F 17/27* (2006.01)
*G06F 17/28* (2006.01)
*G06F 17/21* (2006.01)
*G06Q 50/00* (2012.01)
*G06F 17/24* (2006.01)

(52) U.S. Cl.
CPC ........ *G06F 17/2785* (2013.01); *G06F 17/218* (2013.01); *G06F 17/24* (2013.01); *G06Q 50/01* (2013.01)

(58) Field of Classification Search
CPC . G06Q 50/01; G06F 17/2785; G06F 17/3053; G06F 17/30719
See application file for complete search history.

(56) References Cited

U.S. PATENT DOCUMENTS

| 2013/0311485 A1* | 11/2013 | Khan | G06F 17/2785 707/748 |
| 2015/0058344 A1* | 2/2015 | Bhatia | G06F 17/30598 707/737 |
| 2015/0073774 A1* | 3/2015 | Becker | G06F 17/2735 704/9 |
| 2016/0055235 A1* | 2/2016 | Zhang | G06F 17/30684 707/749 |

OTHER PUBLICATIONS

Peng, Wei, and Dae Hoon Park. "Generate adjective sentiment dictionary for social media sentiment analysis using constrained nonnegative matrix factorization." Fifth International AAAI Conference on Weblogs and Social Media. 2011.*

Hatzivassiloglou, Vasileios, and Kathleen R. McKeown. "Predicting the semantic orientation of adjectives." Proceedings of the eighth conference on European chapter of the Association for Computational Linguistics. Association for Computational Linguistics, 1997.*

Dave, Kushal, Steve Lawrence, and David M. Pennock. "Mining the peanut gallery: Opinion extraction and semantic classification of product reviews." Proceedings of the 12th international conference on World Wide Web. ACM, 2003.*

* cited by examiner

*Primary Examiner* — Matthew Barker
(74) *Attorney, Agent, or Firm* — Morris & Kamlay LLP (57) ABSTRACT

Provided are techniques for avoiding sentiment model overfitting in a machine language model. A current list of keywords in a current sentiment model can be updated to create a proposed list of keywords in a proposed sentiment model. Machine-generated sentiment results, based on the proposed sentiment model, are presented to identify model overfitting, without revising the current set of keywords. The proposed set of keywords can be edited, and when overfitting is not present, the current list of keywords is replaced by the proposed list of keywords.

18 Claims, 4 Drawing Sheets

AVOIDING SENTIMENT MODEL OVERFITTING IN A MACHINE LANGUAGE MODEL

BACKGROUND

Topic-specific emotions of a person writing a post may be viewed as the writer's "sentiment." Correctly identifying sentiment from the post can add helpful context identifying the writer's feelings about the post's topic. Accurately determining the writer's sentiment requires correctly implying additional information about the post's topic by identifying a tone of language included in the post. However, languages are complex. Thus, accurately determining the writer's sentiment is challenging.

BRIEF DESCRIPTION OF THE DRAWINGS

The accompanying drawings, which are included to provide a further understanding of the disclosed subject matter, are incorporated in, and constitute a part of, this specification. The drawings also illustrate examples of the disclosed subject matter, and together with the detailed description, serve to explain the principles of examples of the disclosed subject matter. No attempt is made to show structural details in more detail than may be necessary for a fundamental understanding of the disclosed subject matter and various ways in which the disclosed subject matter can be practiced.

DETAILED DESCRIPTION

A topic-specific emotion of a person (e.g., a "poster") producing digital text (e.g., a "post") may be viewed as the poster's "sentiment." Examples of the digital text include a social media post, a review of a product, a review of a service, a review of web content, the like, or a combination thereof. The digital text can be typed by the poster, spoken by the poster and converted from speech to digital text, the like, or a combination thereof.

Sentiment analysis can determine an attitude or intended emotion of the poster with respect to a topic, the overall contextual polarity of a document, the like, or a combination thereof. Correctly identifying sentiment from the post can add helpful context identifying the poster's feelings about the post's topic. Sentiment analysis can use natural language processing, text analysis, computational linguistics, the like, or a combination thereof to extract subjective information from a post. The poster's sentiment can be determined by this machine-model, which generates sentiment results. The sentiment results can be used to help understand a group of people, which includes the poster, by evaluating the poster's feelings about a product, a brand, an industry, a competitor, the like, or a combination thereof. The sentiment results can also identify unhappy customers to whom a company should respond.

In an example, a post's related sentiment can be classified in a simplified manner as being positive, neutral, or negative. Advanced classifications can identify emotional states, such as anger, depression, happiness, kindness, etc. Advanced classifications can also provide an indication of the poster's sentiment on a spectrum, with a detailed measure of degree of sentiment. Positive sentiment can be indicated with a positive number, negative sentiment can be indicated with a negative number, and zero can indicate indifference. Alternatively, negative sentiment can be indicated with a positive number, positive sentiment can be indicated with a negative number, and zero can indicate indifference.

In an example, a sentiment spectrum can have one extreme with an associated value of +1.00 indicating most extreme positive sentiment. The opposite extreme of the sentiment spectrum can have an associated value of −1.00 indicating most extreme negative sentiment. Thus, a value of 0.00 indicates indifference (i.e., neutral sentiment), a value of +0.30 indicates slightly positive sentiment, and a value of −0.60 indicates more significant negative sentiment. Other ranges of sentiment indicators can also be used within the scope of the disclosed subject matter. In some examples, users can enter actual user sentiments as feedback to posted messages in various forms. For example, some social media websites allow a user to enter feedback by clicking a smiling emoticon, a neutral emoticon, or a crying emoticon, or in some other form of a positive, neutral, or negative input. In examples, more than three levels of granularity can be provided for user feedback, for example, a range of 0 to 5, or 0 to 10, from extremely negative sentiment to extremely positive sentiment. The numbers used in this example are not limiting, and any practicable numbers can be associated with respective sentiment.

Numerical values representing the poster's sentiment can be calculated by applying a sentiment model to one or more posts by the poster. A sentiment model is executed be a machine, and processes natural language of the one or more posts to determine factors such as tone, intent, subjects, themes, the like, or a combination thereof. The factors are then used to calculate an indication of sentiment.

In an example, a sentiment model compares at least some of the constituent words of a post to a list of keywords. The list of keywords can include certain words, phrases, or sentences, which are regarded as being frequently or commonly used in describing or characterizing certain attributes of a topic. For example, keywords such as "cheap," "inexpensive," "economical," "bargain," or "value" can be used to describe a product, while keywords such as "love," "hate," and "enjoy" can be used to describe other sentiment associated with a topic.

In this example, each keyword on the list has a respective weight (i.e., a respective number) indicating a related sentiment. When a word in the post matches a keyword on the list, the respective weight for the matching keyword is retrieved. This process proceeds for other words in the post. Thus, an average numerical value of sentiment for the post can be calculated by averaging the retrieved respective weights for all matching words.

As an example, a post can state "I love this handbag, it is elegant!" and the keyword list can include the keywords "love" and "elegant." When the sentiment model is run, the word "love" matches and can have a respective weight of 0.80 on a sentiment scale of −1.00 to +1.00, where negative values indicate negative sentiment and positive values indicate positive sentiment. The word "elegant" also matches, and can have a respective weight of 0.30. Thus, the average numerical value of sentiment for the post is (0.80+0.30)/2=0.55, which indicates a degree of positive sentiment. In examples, other mathematical calculations can be performed to produce sentiment results. For example, a weighted average, a median, another statistical function, the like, or a combination thereof can be calculated to produce a sentiment result.

In an example, the average numerical value of sentiment can be displayed as a numerical value to the poster, another user, an administrator, the like, or a combination thereof. In an example, the average numerical value of sentiment can be displayed in a pictorial form to the poster, another user, an administrator, the like, or a combination thereof. For example, negative sentiment (e.g., an average lower than substantially zero) can be communicated with a picture (e.g., an emoticon) of a frowning face, positive sentiment (e.g., an average greater than substantially zero) can be communicated with a picture of a smiling face, and indifferent sentiment (e.g., an average equal to substantially zero) can be communicated with a picture of a face which displays no emotion.

Sentiment models may not always produce results which the poster would consider as accurate. Generally, there is no single, perfect sentiment model which perfectly functions for all posters and all posts. As an example of a sentiment model error, a sentiment model may not accurately distinguish between different meanings of the same word, as used by two different posters. For example, two people, Shawn and Bob, both drink and then review "CaffeineberryBuz Energy Drink." Shawn becomes violently ill from the drink, and posts a review of "CaffeineberryBuz Energy Drink . . . sick!" Shawn intends the term "sick" to mean "illness"—which is intended as a negative sentiment. Bob, on the other hand, does not become ill, really likes the drink, and posts a review of "CaffeineberryBuz Energy Drink . . . sick!" Bob intends the term "sick" to mean "amazing and trendy"—which is meant as a positive sentiment. Thus, evaluating these two posts using the exact same sentiment model would not accurately distinguish between the two different meanings of the same word, as used by the two different posters. Sentiment models can also produce imperfect sentiment results due to the poster using sarcasm (e.g., "This game is awesome. Not."), irony (e.g., "Right, that helps . . . "), informal language (e.g., "y'all"), abbreviations (e.g., "OMG"), slang (e.g., "bitchin'!"), the like, or a combination thereof.

A one-sentiment model-fits-all approach may lead to too many errors in sentiment results. A solution to this problem is to enable a poster to revise and refine a respective sentiment model for that specific poster, as nobody knows the poster's true sentiment like the poster themselves. Thus, the poster can be provided with a list of the poster's past posts and the post's respective sentiment results. Words in the post, which match keywords, can be highlighted or otherwise identified relative to the other words in the post. Keywords on the list, which match the words in the post, can also be displayed with the keyword's respective weight. This enables the poster to compare the post's respective sentiment results with the poster's actual sentiment. The poster can then revise a respective weight of a keyword to indicate the poster's true sentiment about the topic of the post. The poster can also delete one or more keywords from the list. The sentiment model can receive the edits, and the list can be updated accordingly. Thus, the poster can personalize the poster's respective sentiment model so that the poster's respective sentiment model can provide accurate results. Thus, personalization can advantageously improve on conventional sentiment model techniques, and improve functioning of a machine executing a sentiment model.

In an example, the poster is provided with an opportunity to mark one or more posts which may have incorrect sentiment results. A post can be marked for later review if the content of the post includes, or at least likely includes, one or more key words, phrases, or sentences which are regarded by the sentiment model as being typically associated with a specific topic. Thus, the poster can later be presented with a group of the marked posts to enable the poster to 1) compare the marked post's respective sentiment results with the poster's actual sentiment, and 2) revise any respective weight of a keyword. Thus, the poster need not search through a larger group of posts in order to find the posts which need comparison.

Personalizing the poster's respective sentiment model improves the accuracy of calculating the poster's sentiment. However, excessively customizing the sentiment model can lead to overfitting the sentiment model to the small number of posts which led to the poster's revisions. Overfitting may occur when the revised sentiment model takes into account too much information from the small number of posts which led to the poster's revisions, and limits the capacity of the revised sentiment model to generalize. In other words, the revised sentiment model becomes overfit when the revised sentiment model is over-bound to the posts which led to the poster's revisions. As a result, when the revised sentiment model is overfit, the revised sentiment model very accurately analyzes the posts which led to the poster's revisions, but poorly analyzes other posts. Accordingly, it is beneficial and advantageous to minimize overfitting the revised sentiment model.

Figure 1A:
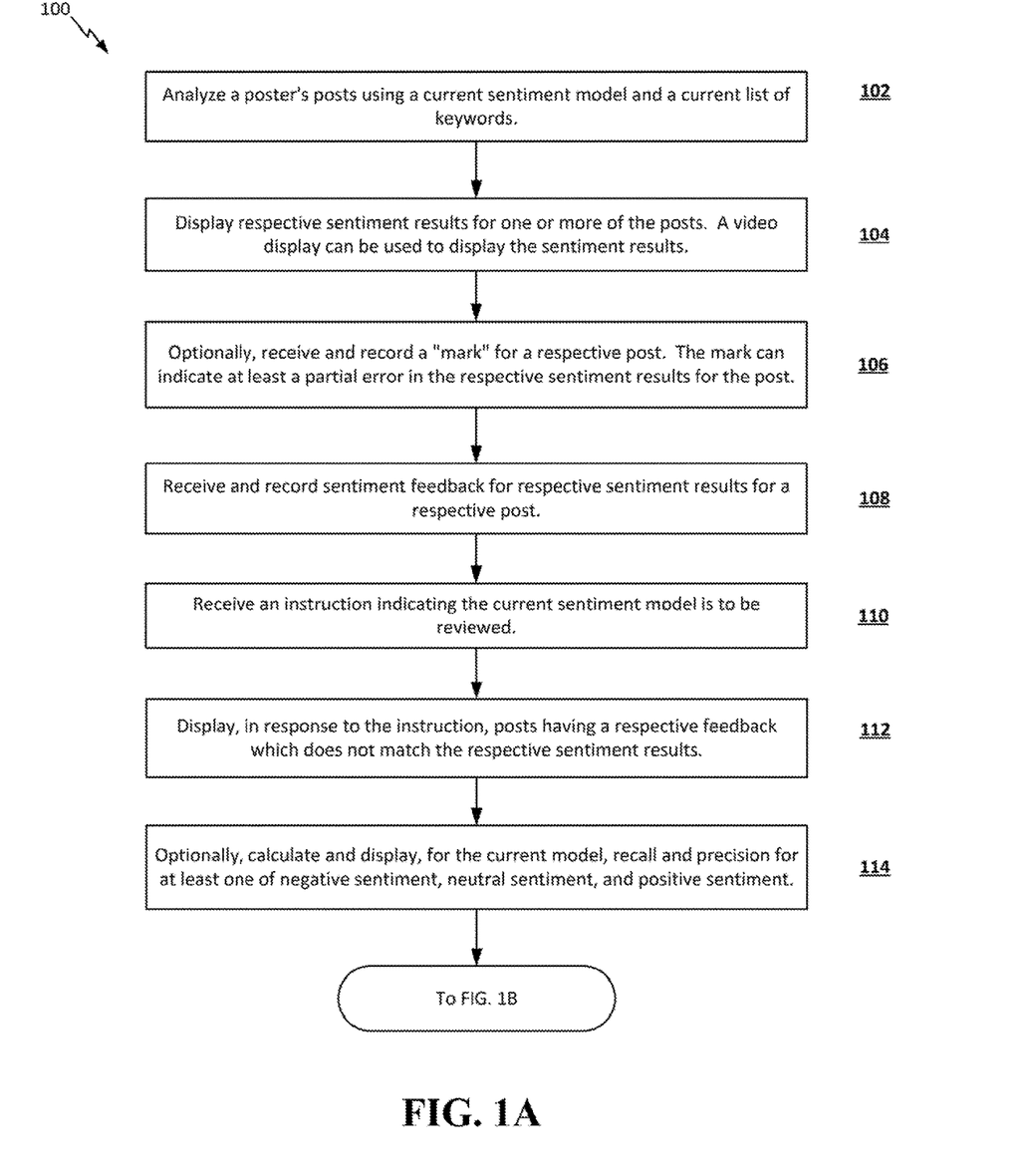
FIGS. 1A-C depict a flowchart illustrating an example of a method for avoiding sentiment model overfitting, according to an example of the disclosed subject matter.
Figure 1B:
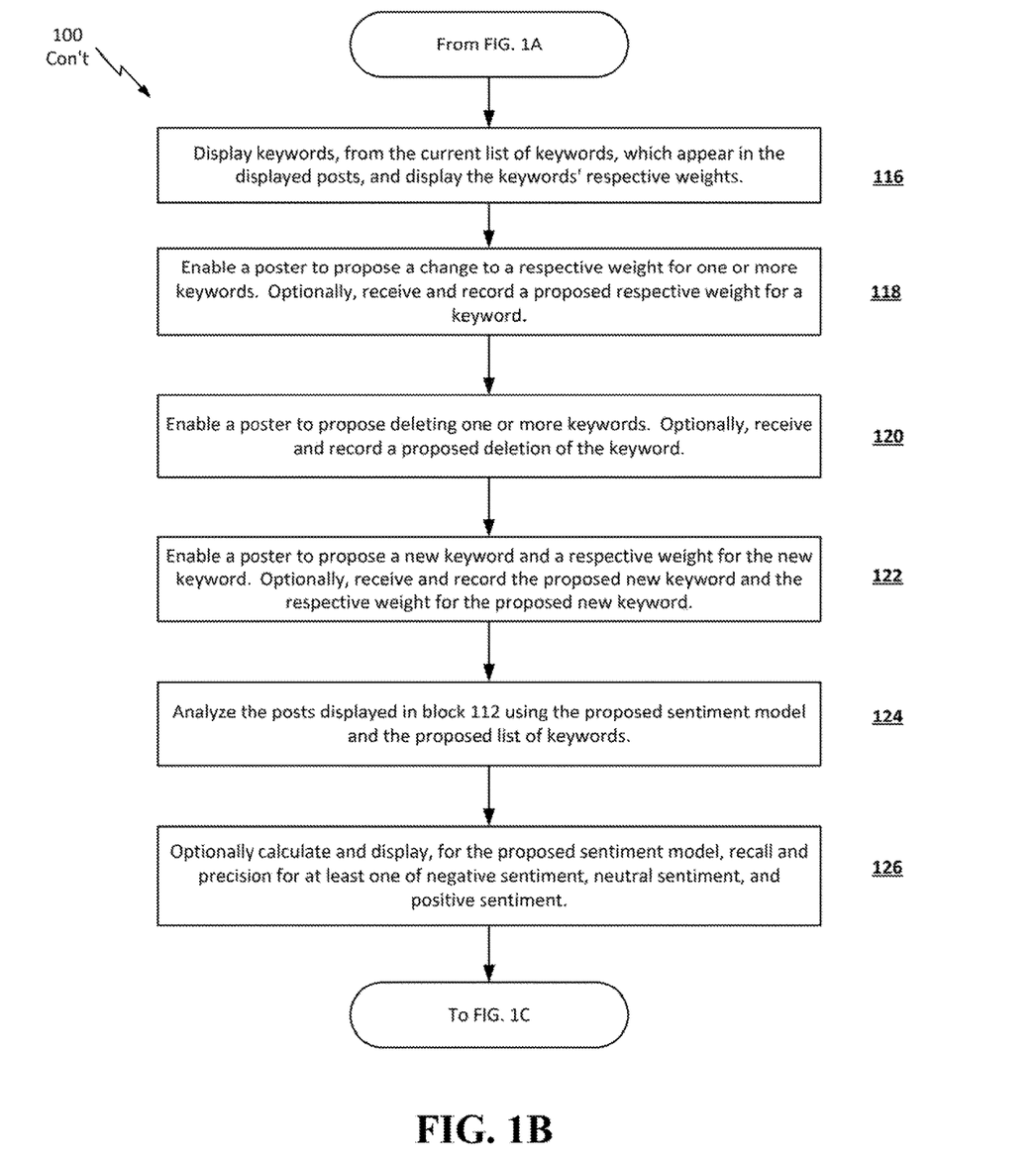
Figure 1C:
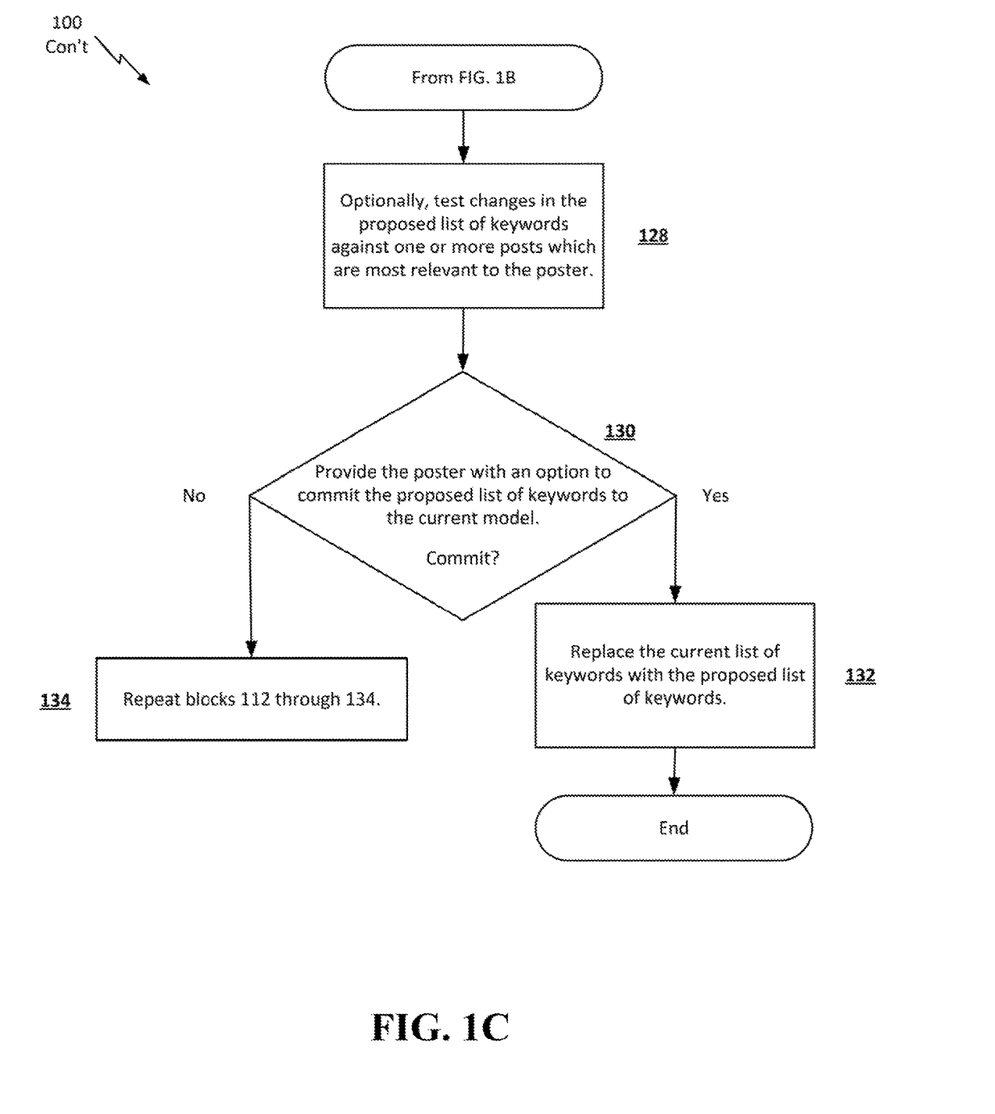

FIG. 1 depicts a flowchart of a method 100 to avoid overfitting a sentiment model, according to an embodiment. An apparatus described herein can perform the method 100 at least in part. Generally, overfitting can be corrected by a process that includes creating a proposed sentiment model based on a poster's input, then implementing the poster's feedback on sentiment results generated by the proposed sentiment model.

In block 102, a poster's posts are analyzed using a current sentiment model, to produce respective sentiment results for each post. A processor (i.e., a machine) executes the current sentiment model. The current sentiment model includes a current list of keywords having respective weights. The respective weights indicate sentiment with a numerical value for respective keywords.

One or more posts, one or more keywords, one or more communications (e.g., to a user, from a user), the like, or a combination thereof can be in at least one language, such as English, Traditional Chinese, Simplified Chinese, a combination of Traditional Chinese and Simplified Chinese, Japanese, Korean, Dutch, French, German, Italian, Portuguese, Spanish, emoticons, the like, or a combination thereof.

In block 104, the respective sentiment results for one or more of the posts are displayed. A video or graphic display can be used to display the sentiment results. The sentiment results can be displayed adjacent to respective posts. In response, the poster can compare the sentiment results to the poster's actual sentiment, in order to identify any errors in the sentiment results.

In block 106, a "mark" for a respective post can be received (e.g., from the poster) and recorded. The mark can be provided by the poster and can indicate at least a partial error in the sentiment results for the respective post. A marked post can be subsequently considered when the current list of keywords is revised, for example, in block 112. Thus, the mark helps the poster by memorializing the error, so the poster need not remember the error. In examples, a mark, such as a star or a checkmark, can be displayed adjacent to a respective post.

In block 108, sentiment feedback is received (e.g., from the poster) and recorded. The sentiment feedback is received for respective sentiment results. The feedback can indicate the poster's actual sentiment about the post's topic. The feedback can be in a form of negative actual sentiment, indifferent actual sentiment, or positive actual sentiment. In examples, the sentiment feedback is compared to the sentiment results only for posts marked in block 106, to reduce a set of posts to be reviewed.

In block 110, an instruction is received. The instruction indicates the current sentiment model is to be reviewed.

In block 112, in response to the instruction, posts having a respective feedback, which does not match the respective sentiment results, are displayed. In response to the instruction, posts which are marked can be displayed. In response to the instruction, a random selection of the poster's posts can be displayed to produce a larger set of training data. In the displayed posts, the keywords found in the displayed posts can be highlighted to ease identification of the keywords.

In block 114, for the current model, recall and/or precision for at least one of negative sentiment, neutral sentiment, and positive sentiment can be calculated and displayed. In an example, recall is a measure of how complete the sentiment results are, and describes a quantity of sentiment results. Precision is a measure of how useful the sentiment results are, and is a measure of the quality of the sentiment results. The poster's feedback can be used to calculate the recall and the precision. The recall and/or precision can be displayed in a bar graph form, as a percentage, as a ratio, the like, or a combination thereof.

In block 116, a list of keywords, which are from the current list of keywords and which also appear in the displayed posts, is displayed. The keywords' respective weights are also displayed. The displaying helps the poster understand how the current sentiment model functions.

In block 118, a poster is enabled to propose a change to a weight for one or more respective keywords. A proposed weight for a respective keyword can be received and recorded. The proposed change to the weight for the one or more respective keywords can be received from the poster. For example, the poster can propose changing a weight of the respective keyword "sick" from −1.00 to +1.00. The updated weight can be displayed. The proposed change can be incorporated in a proposed sentiment model having a proposed list of keywords. The proposed change does not change the current sentiment model or the current list of keywords until the proposed change is subsequently committed.

In block 120, the poster is enabled to propose deleting one or more keywords. Deleting a keyword removes the keyword from the proposed list of keywords, and does not merely assign a weight of 0.00 to the keyword. Thus, when a sentiment model is run and a deleted keyword is encountered by the sentiment model, the sentiment model does not use the deleted keyword to produce sentiment results. A proposed deletion of the keyword can be received and recorded. In an example, the keyword can be prefixed with a mark, such as a tilde ("~"), to indicate the keyword is deleted from the proposed list of keywords. For example, the poster can propose deleting the keyword "sick." The proposed deletion can be received from the poster. The keyword can be displayed as being proposed for deletion. The proposed deletion can be incorporated in the proposed sentiment model having the proposed list of keywords. The proposed deletion does not change the current sentiment model or the current list of keywords until the proposed change is subsequently committed.

In block 122, the poster is enabled to propose a new keyword and a respective weight for the new keyword. The proposed new keyword and the respective weight for the proposed new keyword can be received and recorded. The proposed new keyword and the related proposed new weight can be received from the poster. For example, the poster can propose adding a new keyword of "cool," where "cool" has a respective weight of +0.80. The proposed new keyword and the proposed new keyword's respective weight can be displayed. The proposed addition can be incorporated in the proposed sentiment model having the proposed list of keywords. The proposed addition does not change the current sentiment model or the current list of keywords until the proposed change is subsequently committed.

Blocks 124 through 128 enable a poster to understand the effects of the poster's changes.

In block 124, the posts displayed in block 112 are analyzed using the proposed sentiment model and the proposed list of keywords. Additional posts by the poster, which are not posts displayed in block 112, can also be analyzed using the proposed sentiment model and the proposed list of keywords to test the proposed sentiment model against a large number of stored posted messages which were not used for determining the proposed list of keywords. The displaying of the sentiment results produced by the proposed sentiment model and the proposed list of keywords can enable a poster to identify overfitting the proposed sentiment model.

In block 126, optionally calculate and display, for the proposed sentiment model, recall and/or precision for at least one of negative sentiment, neutral sentiment, and positive sentiment. The poster's feedback can be used to calculate the recall and the precision for the proposed sentiment model. The recall and/or the precision for the proposed sentiment model can be displayed in a bar graph form, as a percentage, as a ratio, the like, or a combination thereof. The information displayed can enable the poster to evaluate the effects of the revisions included in the proposed list of keywords, and enable the poster to decide if the proposed changes overfit the proposed sentiment model.

In optional block 128, the poster is provided with an option to test the changes in the proposed list of keywords against one or more posts which are most relevant to the poster. Thus, an instruction, indicating the test is to be performed, can be received. Relevance of a post can be based on an estimated monthly volume (EMV) of content which is most relevant to the poster. An instruction to test the changes in the proposed list of keywords against the one or more relevant posts can be received from the poster. This testing can provide the user with an advanced beta test of the proposed keyword list, prior to committing the changes in the proposed list of keywords to the current model. The one or more posts which are most relevant to the poster are analyzed using the proposed sentiment model and the proposed list of keywords. Optionally, for the proposed sentiment model, recall and/or precision are calculated and displayed for at least one of negative sentiment, neutral sentiment, and positive sentiment. The poster's feedback can be used to calculate the recall and the precision for the proposed sentiment model. The recall and/or the precision for the proposed sentiment model can be displayed in a bar graph or other graphical form, as a percentage, as a ratio, the like, or a combination thereof. The information displayed can enable the poster to evaluate the effects of the revisions included in the proposed list of keywords, and enable the poster to decide if the proposed changes overfit the proposed sentiment model.

In block 130, the poster is provided with an option to commit the changes in the proposed list of keywords. Commitment includes replacing the current list of keywords with the proposed list of keywords. An instruction to commit the changes in the proposed list of keywords to the current model can be received from the poster.

In block 132, if an instruction indicating commit is received, the current list of keywords is replaced with the proposed list of keywords. Identifying and mitigating overfitting advantageously improves on conventional sentiment model techniques, and improves functioning of a machine executing a sentiment model.

In block 134, if the instruction indicates do not commit the changes, then blocks 112 through 134 can be repeated. Repeating enables the poster to make further revisions to the proposed list of keywords to mitigate overfitting the proposed sentiment model. Repeating also enables the poster to "undo" the poster's changes if desired.

The provided systems and methods can be implemented as a multi-tenant system. A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

The system can include a server that can generate one or more virtual applications based on data stored in a common database shared between the tenants. Each virtual application can provide access to data in the database for each of the one or more tenants utilizing the system. A tenant can, for example, request social media posts, metadata, and/or analytics provider data. Although multiple tenants can share access to a common server and database, the particular data and services provided from the system to each tenant can be securely isolated from those provided to other tenants. The multi-tenant architecture therefore allows different sets of users to share functionality without necessarily sharing their private data. Similarly, the appearance of the interface of each tenant with the system can be unique.

Figure 2:
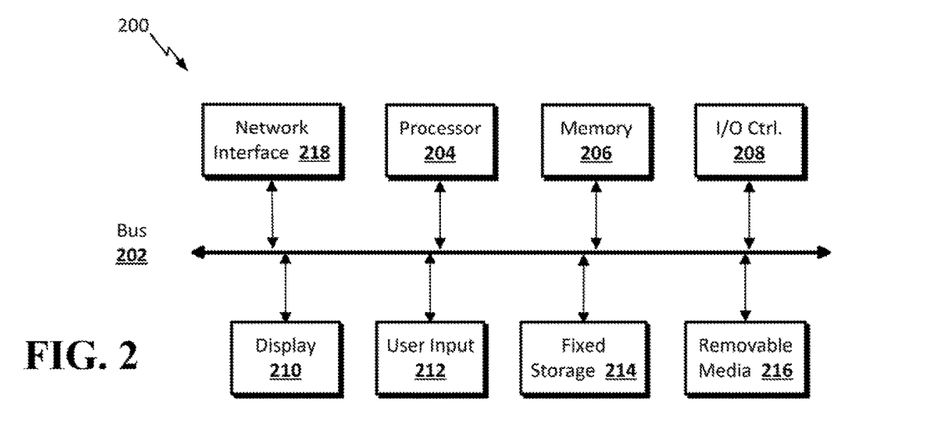
FIG. 2 shows a computer, according to an example of the disclosed subject matter.

Examples of the presently disclosed subject matter can be implemented in and used with a variety of component and network architectures, and are not necessarily limited to a multi-tenant system. FIG. 2 is an example of a computer 200 suitable for implementations of the presently disclosed subject matter. At least one element of the computer 200 can be configured to perform at least a portion of a method described herein. The example of the computer as shown in FIG. 2 can be a client device, a remote platform, or a server on which the disclosed systems and methods can be performed.

As shown in FIG. 2, the computer 200 includes a bus 202 which interconnects major components of the computer 200, such as a central processor 204, a memory 206 (typically RAM, but which can also include ROM, flash RAM, or the like), an input/output controller 208, a user display 210, such as a display screen via a display adapter, a user input interface 212, which can include one or more controllers and associated user input devices such as a keyboard, mouse, and the like, and can be closely coupled to the I/O controller 208, fixed storage 214, such as a hard drive, flash storage, Fiber Channel network, SAN device, SCSI device, and the like, and a removable media component 216 operative to control and receive an optical disk, flash drive, the like, or a combination thereof.

The bus 202 allows data communication between the central processor 204 and the memory 206, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 200 are generally stored on and accessed via a computer readable medium, such as a hard disk drive (e.g., fixed storage 214), an optical drive, floppy disk, or other storage medium.

The fixed storage 214 can be integral with the computer 200 or can be separate and accessed through other interfaces. A network interface 218 can provide a direct connection to a remote server via a wired or wireless telephone link, a cable link, an optical fiber link, a satellite link or the like, to the Internet via an Internet service provider (ISP), or a direct connection to a remote server via a direct network link to the Internet via a POP (point of presence) or other technique. The network interface 218 can provide such connection using wireless techniques, including digital cellular telephone connection, Cellular Digital Packet Data (CDPD) connection, digital satellite data connection or the like. For example, the network interface 218 can allow the computer to communicate with other computers via one or more local, wide-area, or other networks, as shown in FIG. 3.

Many other devices or components (not shown) can be connected in a similar manner (e.g., document scanners, digital cameras and so on). Conversely, not all of the components shown in FIG. 2 need be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 206, fixed storage 214, removable media 216, or on a remote storage location.

Figure 3:
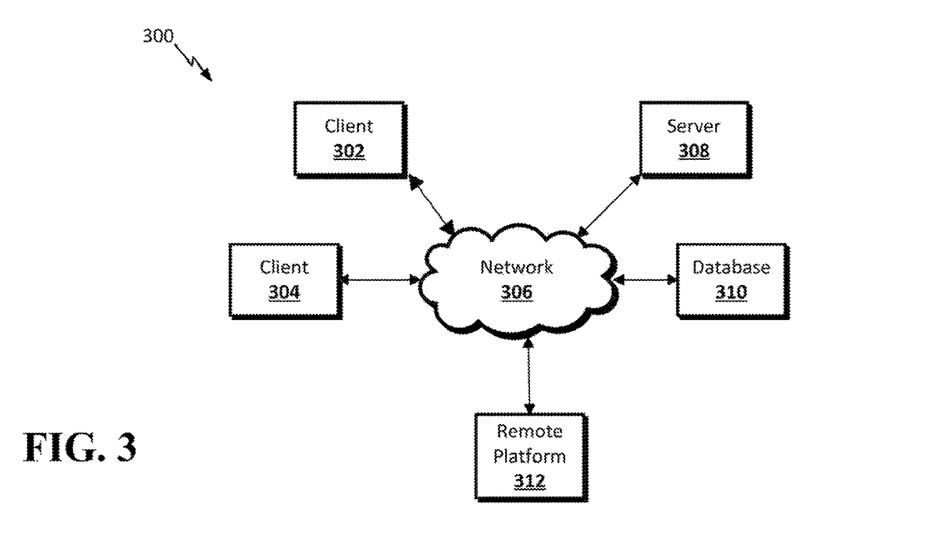
FIG. 3 shows a network configuration, according to an example of the disclosed subject matter.

FIG. 3 shows an example network 300 according to an example of the disclosed subject matter. At least one element of the example network 300 can be configured to perform at least a portion of a method described herein. One or more clients 302 and/or 304, such as local computers, smart phones, tablet computing devices, and the like can connect to other devices via one or more networks 306. The network 300 can be a local network, wide-area network, the Internet, or any other suitable communication network or networks, and can be implemented on any suitable platform including wired and/or wireless networks. The clients can communicate with one or more servers 308 and/or databases 310. The devices can be directly accessible by the clients 302, 304, or one or more other devices can provide intermediary access such as where the server 308 provides access to resources stored in the database 310. The clients 302, 304 also can access a remote platform 312 or services provided by the remote platform 313 such as cloud computing arrangements and services. The remote platform 312 can include the one or more servers 308 and/or the database 310. At least a part of a methods described herein can be performed on one or more of the servers, databases, remote platforms, or client devices in various examples within the scope of the disclosed subject matter.

More generally, various examples of the presently disclosed subject matter can include or be implemented in the form of computer-implemented processes and apparatuses for practicing those processes. Examples also can be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing examples of the disclosed subject matter. Examples also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing examples of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Examples can be implemented using hardware that can include a processor, such as a general purpose microprocessor and/or an Application Specific Integrated Circuit (ASIC) that implements all or part of the techniques according to examples of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to examples of the disclosed subject matter.

Within this description, the singular portends the plural where practicable. This description, for purpose of explanation, has been described with reference to specific examples. However, the illustrative discussions are not intended to be exhaustive or to limit examples of the disclosed subject matter to the precise forms disclosed. Many modifications and variations are possible in view of the above teachings. The examples were chosen and described to explain the principles of examples of the disclosed subject matter and their practical applications, to thereby enable others skilled in the art to utilize those examples as well as various examples with various modifications as may be suited to the particular use contemplated.

The invention claimed is:

1. A method, comprising:
   determining, using a first sentiment model having a current list of keywords and respective weights, respective sentiment results for a plurality of posts, wherein the determining is performed using a processing device;
   receiving, via a user interface, sentiment feedback for the respective sentiment results;
   displaying a first set of posts which are in the plurality of posts and have a sentiment feedback not matching the respective sentiment results;
   displaying:
      keywords which appear in the first set of posts; and
      the keywords' respective weights;
   receiving a first change including at least one of:
      a first proposed change to a respective weight of one or more of the keywords;
      a first proposed deletion of one or more of the keywords; or
      a first proposed new keyword and a respective weight of the first proposed new keyword;
   maintaining unchanged the current list of keywords and respective weights while creating a proposed list of keywords and respective weights by applying the first change to the current list of keywords and respective weights;
   analyzing the first set of posts, using the proposed list of keywords and respective weights;
   enabling identifying overfitting by displaying sentiment results for the first set of posts produced using the proposed list of keywords and respective weights;
   receiving a second change including at least one of:
      a second proposed change to a respective weight of one or more of the keywords;
      a second proposed deletion of one or more of the keywords; or
      a second proposed new keyword and a respective weight of the second proposed new keyword;
   updating the proposed list of keywords and respective weights by applying the second change to the proposed list of keywords and respective weights;
   after applying the second change to the proposed list of keywords and respective weights, re-analyzing the first set of posts using the proposed list of keywords and respective weights;
   enabling identifying overfitting by displaying sentiment results for the first set of posts produced using the proposed list of keywords and respective weights; and
   creating a second sentiment model by replacing the current list of keywords and respective weights with the second proposed list of keywords and respective weights.

2. The method of claim 1, further comprising:
   receiving an indication of a post in the plurality of posts as being marked, wherein the mark indicates at least a partial error in the respective sentiment results for the post; and
   displaying the marked post as one of the displayed first set of posts.

3. The method of claim 1, wherein the received sentiment feedback is in a form of negative actual sentiment, indifferent actual sentiment, or positive actual sentiment.

4. The method of claim 1, further comprising analyzing, using the proposed list of keywords and the respective weights, additional posts which do not have respective sentiment feedback not matching the respective sentiment results.

5. The method of claim 1, further comprising:
   calculating, for the sentiment results produced using the proposed list of keywords and the respective weights, recall for at least one of negative sentiment, neutral sentiment, and positive sentiment; and
   displaying the results of the calculating.

6. The method of claim 1, further comprising:
calculating, for the sentiment results produced using the proposed list of keywords and respective weights, precision for at least one of negative sentiment, neutral sentiment, and positive sentiment; and
displaying the results of the calculating.

7. A system for mitigating sentiment model overfitting, the system comprising:
a processor; and
a memory communicably coupled to the processor, wherein the memory includes computer instructions configured to cause the processor to:
determine, using a first sentiment model having a current list of keywords and respective weights, respective sentiment results for a plurality of posts;
receive sentiment feedback for the respective sentiment results;
display a first set of posts which are in the plurality of posts and have a sentiment feedback not matching the respective sentiment results;
display:
  keywords which appear in the first set of posts; and
  the keywords' respective weights;
receive a first change including at least one of:
  a first proposed change to a respective weight of one or more of the keywords;
  a first proposed deletion of one or more of the keywords; or
  a first proposed new keyword and a respective weight of the first proposed new keyword;
maintain unchanged the current list of keywords and respective weights while creating a proposed list of keywords and respective weights by applying the first change to the current list of keywords and respective weights;
analyze, using the proposed list of keywords and respective weights, the first set of posts;
enable identifying overfitting by displaying sentiment results for the first set of posts produced using the proposed list of keywords and respective weights;
receive a second change including at least one of:
  a second proposed change to a respective weight of one or more of the keywords;
  a second proposed deletion of one or more of the keywords; or
  a second proposed new keyword and a respective weight of the second proposed new keyword;
update the proposed list of keywords and respective weights by applying the second change to the proposed list of keywords and respective weights;
after applying the second change to the proposed list of keywords and respective weights, re-analyze the first set of posts using the proposed list of keywords and respective weights;
enable the identification of overfitting by the display of sentiment results for the first set of posts produced using the proposed list of keywords and respective weights; and
create a second sentiment model by replacing the current list of keywords and respective weights with the proposed list of keywords and respective weights.

8. The system of claim 7, wherein the computer instructions further comprise computer instructions to cause the processor to:
receive an indication of a post in the plurality of posts as being marked, wherein the mark indicates at least a partial error in the respective sentiment results for the post; and
display the marked post as one of the displayed first set of posts.

9. The system of claim 7, wherein the received sentiment feedback is in a form of negative actual sentiment, indifferent actual sentiment, or positive actual sentiment.

10. The system of claim 7, wherein the computer instructions further comprise computer instructions to cause the processor to analyze, using the proposed list of keywords and respective weights, additional posts which do not have respective sentiment feedback not matching the respective sentiment results.

11. The system of claim 7, wherein the computer instructions further comprise computer instructions to cause the processor to:
calculate, for the sentiment results produced using the proposed list of keywords and respective weights, recall for at least one of negative sentiment, neutral sentiment, and positive sentiment; and
display the results of the calculating.

12. The system of claim 7, wherein the computer instructions further comprise computer instructions to cause the processor to:
calculate, for the sentiment results produced using the proposed list of keywords and respective weights, precision for at least one of negative sentiment, neutral sentiment, and positive sentiment; and
display the results of the calculating.

13. The method of claim 1, wherein the second sentiment model is created based on a received selection to commit the proposed list of keywords and respective weights.

14. The method of claim 1, further comprising:
determining whether use of the proposed list of keywords and respective weights results in overfitting.

15. The method of claim 1, further comprising:
receiving a third change including at least one of:
  a third proposed change to a respective weight of one or more of the keywords;
  a third proposed deletion of one or more of the keywords; or
  a third proposed new keyword and a respective weight of the third proposed new keyword;
updating the proposed list of keywords and respective weights by applying the third change to the proposed list of keywords and respective weights;
after applying the third change to the proposed list of keywords and respective weights, re-analyzing the first set of posts using the proposed list of keywords and respective weights; and
enabling identifying overfitting by displaying sentiment results for the first set of posts produced using the proposed list of keywords and respective weights.

16. The system of claim 7, wherein the second sentiment model is created based on a received selection to commit the proposed list of keywords and respective weights.

17. The system of claim 7, wherein the computer instructions further comprise computer instructions to cause the processor to:
determine whether use of the proposed list of keywords and respective weights results in overfitting.

18. The system of claim 7, wherein the computer instructions further comprise computer instructions to cause the processor to:

receive a third change including at least one of:
  a third proposed change to a respective weight of one or more of the keywords;
  a third proposed deletion of one or more of the keywords; or
  a third proposed new keyword and a respective weight of the third proposed new keyword;
update the proposed list of keywords and respective weights by applying the third change to the proposed list of keywords and respective weights;
after applying the third change to the proposed list of keywords and respective weights, re-analyze the first set of posts using the proposed list of keywords and respective weights; and
enable the identification of overfitting by displaying sentiment results for the first set of posts produced using the proposed list of keywords and respective weights.

* * * * *